Jan. 31, 1939.  G. W. MORRIS, JR  2,145,427
APPARATUS FOR PRODUCING HIGH LIGHT IN HALF TONES
Filed Feb. 23, 1937
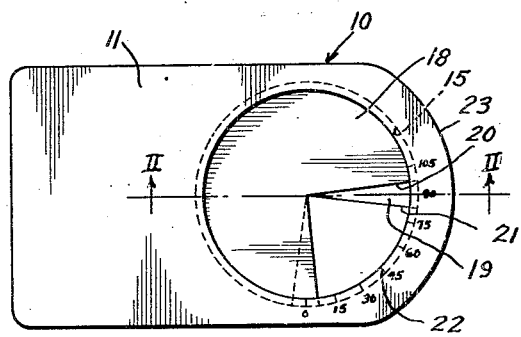
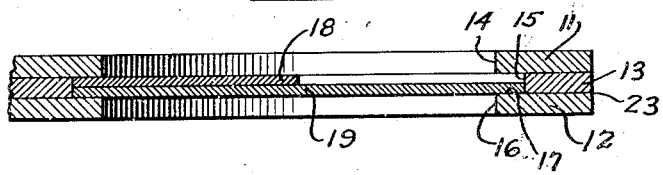
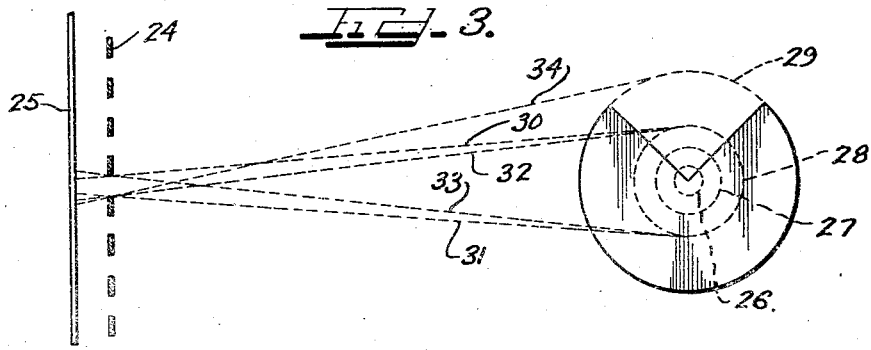
Inventor
GEORGE W. MORRIS, JR Patented Jan. 31, 1939

2,145,427

UNITED STATES PATENT OFFICE 2,145,427

APPARATUS FOR PRODUCING HIGH LIGHT IN HALF TONES

George W. Morris, Jr., Waukegan, Ill., assignor to National Office Supply Company, Waukegan, Ill., a corporation of Illinois Application February 23, 1937, Serial No. 126,963

5 Claims. (Cl. 95—64)

The present invention relates in general to new and useful apparatus for producing high lights in half-tones and is particularly concerned with improved apparatus whereby the dot pattern in the high light areas may be eliminated.

In the usual method of making half-tone negatives, the high light areas of the negative contain a very fine dot pattern so that when a positive print or plate is made from the negative, the high light areas which result are, in fact, not white but have a grey tone cast due to the presence of the small dots. Naturally such a result is undesirable, since it makes it very difficult to bring out the high lights of the object being photographed.

As a result of the foregoing condition, there have been developed several methods in which it is endeavored to eliminate the dot pattern in the high light areas, or reduce the size of these dots to such an extent that they do not give a grey cast to the high light portions of the negative. One of these methods has been to subject the negative to an exposure with the light coming through a stop opening which is larger than the stop utilized for the normal high light exposure. While this method secures the desirable result of tending to eliminate or reduce the size of the dots in the high light areas, the method has the disadvantage of pulling up or distorting the other tones of the tone scale.

Another method which is utilized at the present time consists in the use of apparatus whereby the half-tone screen in front of the negative may be shifted with a gyratory movement. In the use of this apparatus, the dot defining areas of the negative are exposed throughout their entire periphery. While this exposure may be sufficient to eliminate or substantially remove the dots in the high light areas, the larger dots of the grey tones are also affected by having a considerable portion of their peripheral area removed. Moreover, since this method shifts the half-tone screen, it will be apparent to one skilled in the art that the movement of the screen must be very small indeed, thus necessitating the use of micro-adjustments which increase the cost of the apparatus and render the probability of error more likely.

With a view to overcoming the difficulties experienced with the apparatus for practicing the present methods, this invention contemplates an improved, simple and inexpensive apparatus for the producing of high lights in half-tones and the like.

In accordance with the general features of the invention, it is proposed to expose the negative through a decentralized stop associated with the usual diaphragm iris of the camera. This decentralized stop is so arranged that the light rays are offset in one direction sufficiently to eliminate the dots ordinarily appearing in the high light areas of the negative. Moreover, this decentralized or offset stop is made of such shape that it will eliminate the dots in the high light areas without materially distorting the other tones of the tone scale.

The area of the offset stop opening is arranged so that it may be increased and decreased without changing the amount of decentralization or offset. Moreover, the amount of decentralization is determined by the main stop opening by adjusting the iris of the camera.

As an additional feature of the invention, the decentralized stop opening is so arranged that it may be rotated about the central axis of the iris opening, thus permitting the decentralization to be made in any desired direction from the iris opening axis. This is especially advantageous in color work where exposures are made with the screen at different angles.

A further object is to provide improved apparatus whereby high lights may be produced with substantially little or no distortion of the other color tones.

Another object is to provide apparatus of the character described which is susceptible of use in color photography.

Still another object is to provide apparatus for producing high lights in a half-tone negative, wherein the usual dots in the high light areas may be eliminated without substantially affecting the other tones.

Still another object is to provide improved means for shifting the screen shadow in making a supplementary exposure on half-tone negatives.

Still another object is to provide improved means for decentralizing the camera stop in any desired direction.

Another object is to provide a decentralized camera stop having an adjustable area of opening and which can be adjusted without varying the amount of decentralization.

A still further object is to provide in a camera a decentralized stop arranged for cooperative association with the iris diaphragm of the lens mount, and in which the amount of decentralization may be controlled by the size of the iris aperture.

Other objects and features of this invention will more fully appear from the following detailed description taken in connection with the accompanying drawing, which illustrates a single embodiment thereof, and in which:

Figure 1 is a plan view of an auxiliary diaphragm stop embodying the features of the present invention;

Figure 2 is an enlarged fragmentary sectional view of the same, taken substantially on line II—II of Figure 1; and Figure 3 is a view schematically illustrating the use of my improved auxiliary diaphragm stop with the usual iris diaphragm of a camera for the production of high lights in half-tones.

As shown on the drawing:

Figure 1 of the drawing discloses an auxiliary diaphragm stop, generally indicated at 10, which is constructed of a light, opaque, rigid material and is adapted to fit into the usual stop slot of a process lens mount.

This auxiliary diaphragm comprises a carriage constructed of a pair of superposed sheet members 11 and 12 which are maintained in space relation by means of a spacing member 13.

These members are constructed of any suitable light, rigid, opaque material and, if desired, may be made of some metals such as aluminum which can be finished to present a dark surface. The members 11, 12, and 13 at their corresponding ends are provided with axially aligned apertures 14, 15, and 16, the aperture 15 being of slightly greater circumference than either of the other two apertures. With this arrangement, the apertures 14 and 16 are separated by an annular groove 17 within which the peripheral edges of disc shaped members 18 and 19 are mounted in superposed relationship. The discs so mounted may be rotated independently of each other or in concert about an axis which coincides with the center of the apertures 14, 15, and 16.

The discs 18 and 19 are respectively provided with quadrant openings 20 and 21. It will be apparent that with the discs rotatably mounted as just explained, these quadrant openings may be made to coincide to provide a quadrant opening having one-fourth the area of the opening 14, or if desired the edges of the discs defining the openings may be brought into overlapping relationship to furnish an opening of sector shape of less area, the minimum area being when the edges of the discs defining the opening are brought together so that no light may pass through.

It will also be apparent that the quadrant opening or sector opening, when an opening less than a quadrant is desired, may be shifted to any desired angular position in a radial direction from the center line of the openings 14, 15, and 16.

In order to assist the operator in setting the diaphragm opening at a desired angle, the edge of one of the sheet members is provided adjacent the opening therein with spaced markings as shown at 22, these markings having angle-denoting indicia associated therewith. As shown in Figure 1, these angle-denoting indicia may comprise numerals denoting the angles of 0, 15, 30, 45, etc., up to 105. If desired, however, the angle denoting indicia may be from 0 to 90 and then repeated about the diaphragm opening. This scale enables the operator to set the sector opening so that it will be symmetrically disposed on either side of a chosen angle-denoting indicium. For example, in Figure 1 the stop opening is symmetrically disposed on either side of the 45° mark.

In the foregoing arrangement, the sector shaped stop of the auxiliary diaphragm may be adjusted to the desired area and may be turned by moving both discs in unison to dispose the opening in proper relationship to a half-tone screen mounted in the usual manner in the camera at whatever screen angle the nature of the work requires.

The end of the auxiliary diaphragm, which is inserted into the slot of the lens mount, is curved or otherwise shaped as shown at 23 in order to bring the center line of the openings 14, 15, and 16, and the center line of the discs into coincidence with the center of the iris diaphragm aperture of the lens mount to which the carriage is fitted. Also, it is preferred in the construction of the auxiliary diaphragm to make the openings 14 and 16 of such radius as to correspond with the radius of the largest aperture obtainable with the iris diaphragm of the lens mount.

In the use of my invention, the half-tone screen as diagrammatically illustrated at 24 in Figure 3 is mounted in the camera at the screen-angle desired. The auxiliary diaphragm is then placed in the slot of the lens mount and the copy to be photographed (or a sheet of white paper) is illuminated. The discs in the auxiliary diaphragm, after being set to a relative area of aperture suggested by the nature of the copy, are rotated in unison until the aerial image of the wedge shaped opening appears centered in any quadrant formed by the perpendicularly intersecting ruled lines of the half-tone screen. With the aperture set at its largest opening, the radii bounding the quadrant forming the aperture would appear to coincide with and be parallel to the ruled cross lines of the screen. The auxiliary diaphragm being thus properly adjusted is temporarily removed from the lens mount.

A sensitive element, which is schematically shown at 25, is placed in position behind the half-tone screen, and "flash", "detail", and "middle-tone" exposures are made to suit the nature of the copy and the emulsion-speed of the negative. The apertures used are those which normally would be selected to suit the given subject and ratio of reduction or enlargement. For example, the iris diaphragm might be adjusted to give a small stop opening as shown in dotted lines at 26 for the "detail" exposure, an opening such as shown at 27 for the intermediate or "middle-tone" exposure. The iris diaphragm is then adjusted to the radius required for the "high light" stop, diagrammatically illustrated at 28, which normally would complete the series of exposures.

In using my invention, however, the time of the high light exposure is decreased and will ordinarily consist of ½ to ¾ of the usually determined high light exposure.

The radius of the iris diaphragm is then increased until it is greater than the radius of the preceding high light stop aperture by the number of thousandths of an inch represented by the quotient of the following formula:

$$K \times \frac{\text{Camera extension} - \text{screen separation}}{\text{Screen separation}}$$

where K is equal to the number of thousandths of an inch it is desired to move the light image on the film. For example, with a lens 17.74", screen separation being .182", desired lateral shift of light image being .002", the increase in radius necessary when copying the same size would be—

$$2 \times \frac{(35.480 - .182)}{.182} = .388 \text{ inch}$$

With the iris diaphragm so set, the carriage is again introduced into the slot of the lens mount, in the position previously determined, and the remaining fraction of the normal high light exposure is made. The iris diaphragm opening in this case is diagrammatically shown in Figure 3 at 29.

Referring again to Figure 3, when making a high light exposure with the iris stop 28, rays of light will pass through a screen opening and expose a portion of the film, this film portion lying between light rays 30 and 31.

However, at the same time rays indicated by 32 and 33 will illuminate at less intensity a surrounding area which is commonly called the penumbra area. When the auxiliary diaphragm is inserted, as previously explained, for making the last exposure, with the iris stop as indicated at 29, the light is decentralized with reference to the center of the iris diaphragm opening, with the result that light rays as indicated at 34 will extend beyond the penumbra area and expose portions of the film lying under the opaque lines of the half-tone screen. It will, therefore, be evident that by the proper choice of quadrant apertures and displacement or decentralization of the light rays during the last or supplemental exposure, the portions of the negative which usually define the dot pattern of the high lights may be exposed and the dots substantially eliminated. In this connection it should be observed that the amount of decentralization depends upon the opening in the iris diaphragm.

Development of the resulting negative is timed to cease at the moment the high light dots in those areas representing the white in the copy become sufficiently veiled to withstand normal printing illumination without producing a corresponding dot on the positive print.

In color work, the various exposures for the respective colors are usually taken with the half-tone screen at different angles. By having the aperture in the auxiliary diaphragm adjustable, the decentralization may be made in the proper direction for the screen position of the color exposure which is being made.

Moreover, the decentralization may be caused to take place in a vertical or horizontal direction or in any other direction desired. Since the decentralization is only in one direction, the use of my invention will result in the elimination of the dot pattern in the high light areas without distorting or seriously affecting the other tones of the tone scale.

From the foregoing descrpition, it will be apparent that the herein described invention provides an improved apparatus for securing high lights in a half-tone negative, whereby the usual dot pattern of the high light areas may be substantially eliminated with little or no distortion of the other color tones; which is particularly adaptable for use in color photography; which includes improved means for shifting the screen shadow on the half-tone negative by decentralizing the camera stop in any desired direction; and in which the decentralized camera stop is adjustable in area and which can be also adjusted by regulating the size of the iris diaphragm aperture to give varied amounts of decentralization.

It is of course to be understood that although I have described in detail the preferred embodiment of my invention, the invention is not to be thus limited, but only insofar as defined by the scope and spirit of the appended claims.

I claim as my invention:

1. As an article of manufacture, a camera diaphragm comprising a carriage structure, a pair of superposed opaque discs mounted for relative and concerted rotational movement relative to said carriage, said discs respectively having an aperture extending outwardly from the disc center of rotation, whereby upon movement of said discs the apertures may be brought into overlapped relation and coincident relation.

2. As an article of manufacture, a diaphragm adapted for insertion into a slot in a camera lens mount containing a main stop having a predetermined maximum opening, a flat carriage structure having a circular opening therein corresponding to the maximum opening of the main stop, an opaque disc rotatably mounted in said opening with its central axis coincident with the opening axis, said disc containing a decentered aperture having an area one-quarter of the opening in said carriage.

3. As an article of manufacture, a diaphragm adapted for insertion into a slot in a camera lens mount containing a main stop having a predetermined maximum opening, a flat carriage structure having a circular opening therein of substantially the same size as the maximum opening of the main stop, an opaque disc rotatably mounted in said opening with its central axis coincident with the opening axis, said disc containing a decentered aperture having an area one-quarter of the opening in said carriage, said aperture being sector-shaped and having its apex at the center of said disc.

4. As an article of manufacture, a diaphragm adapted for insertion into a slot in a camera lens mount containing a main stop having a predetermined maximum opening, a flat carriage structure having a circular opening therein, corresponding to the maximum opening of the main stop, and a pair of superposed opaque discs mounted in said opening for rotation about a common axis, each of said discs having a sector-shaped aperture therein equal to one-quarter of the area of the opening in said carriage, the apices of said apertures being at the common axis of the discs, whereby the discs may be adjusted to operatively effect a sector-shaped aperture of variable area between the limits of zero and one-quarter of the area of the carriage opening.

5. As an article of manufacture, a device for controlling the transmission of light rays through a lens comprising a diaphragm, a pair of superposed opaque discs mounted on the diaphragm for rotational movement about a common axis, each of said discs having an opening extending to its center, the said openings being of the same size and shape, whereby the size of an effective aperture, cooperatively formed by said openings and the angular position of the effective aperture relative to said common axis may be independently varied.

GEORGE W. MORRIS, Jr.